Aug. 7, 1934. J. A. RAMOS ET AL 1,968,853

MULTIPHASE MOTOR

Filed Sept. 27, 1932

INVENTORS,
JOSEPH A. RAMOS &
POMPEY P. SCRIBANTE.
BY Curtiss L. Slee.
ATTORNEY

Patented Aug. 7, 1934

1,968,853

UNITED STATES PATENT OFFICE 1,968,853

MULTIPHASE MOTOR

Joseph A. Ramos and Pompey P. Scribante, San Francisco, Calif., assignors of one-fifth to Benjamin Delmas, one-fifth to Paulin Cahors, one-tenth to Robert W. Krobitzsch, and one-tenth to Ruben Smith, all of San Francisco, Calif.

Application September 27, 1932, Serial No. 635,016

11 Claims. (Cl. 172—120)

Our invention relates to motors adapted for use optionally on single-phase, quarter-phase, or three-phase supplies.

Among the objects of our invention are: To provide a motor which will operate equally satisfactorily and with substantially equal efficiency when supplied with either single-phase, quarter-phase or three-phase current; to provide a motor of the character described which is not materially larger or more complex than a motor designed for a single service; to provide a motor requiring a minimum of manipulation in changing over from one mode of connection to another; and to provide a motor of the character described having shunt characteristics, and wherein the normal speed of operation may be adjusted in identically the same manner regardless of its mode of connection.

Other objects of our invention will be apparent or will be specifically pointed out in the description forming a part of this specification, but we do not limit ourselves to the embodiment of our invention herein described, as various forms may be adopted within the scope of the claims.

Referring to the drawing.

Broadly considered the motor of our invention comprises the usual motor frame upon which are mounted a plurality of stator units, each provided with a single phase winding. In the preferred form of the invention two such stator units are used, and each is provided with a wave winding. The stator units are positioned with their poles in alinement, and where the wave winding is used the ends of the winding on one unit are nested or interleaved between the ends of the winding of an adjacent unit, so that the separation of the units along the frame is small. An armature is mounted for rotation within the field generated by these stator units. This armature may either be unitary or may have a plurality of core units corresponding in number with the stator units and alined therewith. A single winding threads the entire armature, and is provided with a commutator, and brushes for contacting with this commutator are mounted on the motor frame.

A compensating transformer, having separate primary legs corresponding in number with the stator units, has its respective primary windings connected in parallel with the windings of the stator units. The secondary of this transformer connects with the commutator brushes, and provides a compensating current whose amplitude and phase are such as effectively to neutralize the inductance of the stator winding. The transformer primaries are preferably connected permanently in parallel with the stator windings, which in the preferred form are connected in open delta. Under these circumstances the motors may be connected either to three-phase or quarter-phase three-wire supplies, or the outer ends of the open delta connection may be connected together and the windings connected in parallel across a single phase line. In either of these events the motor will operate with equal efficiency, and the compensating effects will be the same regardless of the mode of connection or the character of the supply within the classes mentioned.

Figure 1:
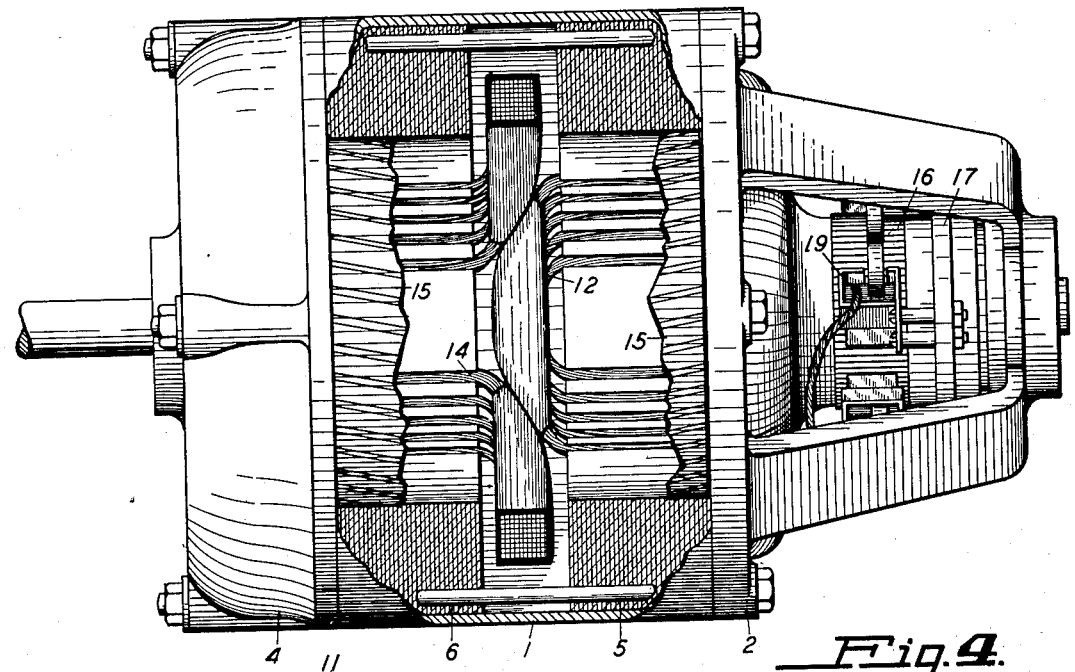
Figure 1 is a view partly in side elevation and partly in section, of the motor embodying our invention. In this view the center portion of the armature is entirely cut away in order to show the disposition of the stator coils.
Figure 2:
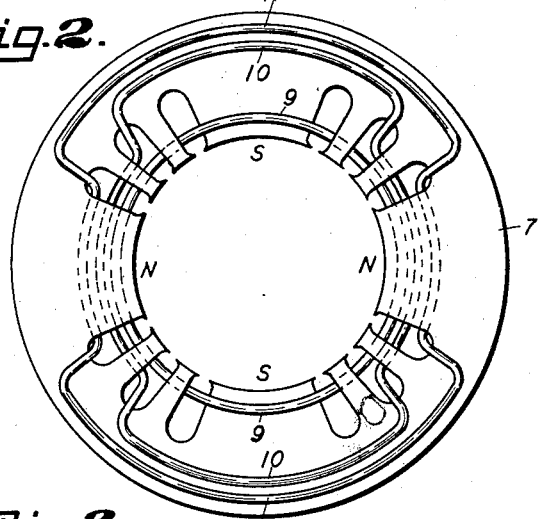
Figure 2 shows the form of the stator punchings, the disposition of the coils being diagrammatically indicated thereon.

A preferred embodiment of the motor of our invention is shown in Figure 1. In this embodiment the motor frame, comprising a cylindrical housing 1, with end bells 2 and 4, carry two similar stator sections 5 and 6. These stator sections are indicated as being of the four-pole type, the punchings 7 being of the general character indicated in Figure 2, and supplied with windings of the wave type, the disposition of these windings being indicated schematically by the single wires 9, 10 and 11 in Figure 2. Coils of this character are very easily wound and formed, each coil being originally wound as a single loop, which is folded over upon itself and then fitted into place in the stator cores. Under these circumstances the ends of the coil 12, on the stator 5, fit between the ends of the coil 14 on the stator 6, allowing the two stator units to be brought very closely together without interference between the coils. This is indicated even more clearly in the schematic diagram of Figure 4, which shows the developed windings. It will be noted also that this arrangement brings the poles into alinement, there being no angular displacement in space between the two units.

Mounted within the fields of the stator units is an armature 15, which may be wound in accordance with any of the well known schemes of armature winding, and which is provided with a commutator 16. A brush holder 17, mounted on the end bell 2, carries brushes 19 for contacting the commutator. The armature winding is preferably fully equalized, in which case a single pair of brushes, spaced 90 mechanical degrees apart, will effectively make the necessary pair of contacts for all four of the armature poles.

Figure 3:
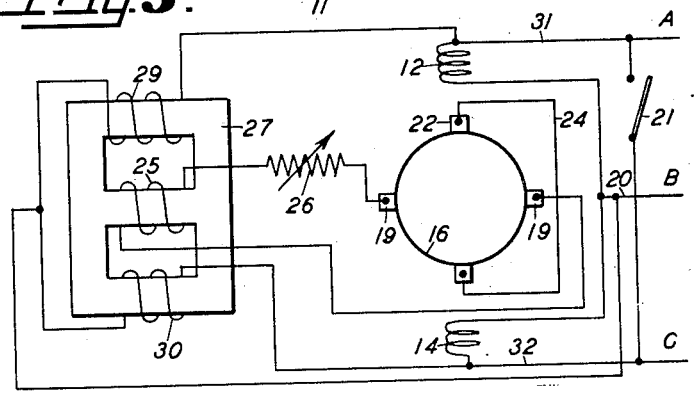
Figure 3 is a schematic diagram showing the stator and compensator connections.

The connection diagram of this motor is shown in schematic form in Figure 3, this diagram being reduced to a bi-polar basis in the customary manner. It will be understood, of course, that any number of pairs of poles may be utilized in this motor as in motors of the conventional type.

Figure 4:
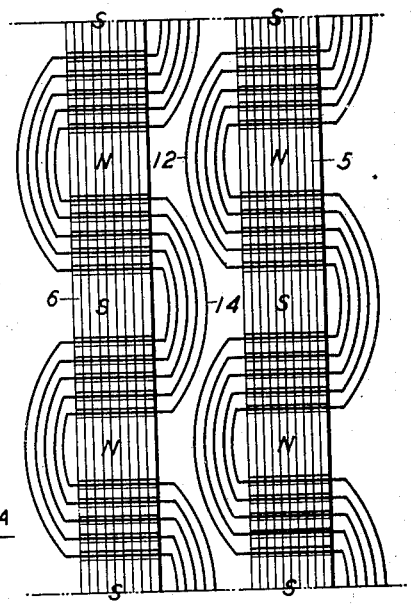
Figure 4 is a diagram showing a development of the stator windings.

The stator windings 12 and 14 are permanently connected together at one end, and a lead 20 brought out from the junction. This connection is so made that when the other ends of these windings are also connected, as, for example, by the switch 21, so that the windings 12 and 14 are connected in parallel, the like poles of the stator units are alined, as shown in Figure 4.

One pair of brushes 22, contacting with the commutator 16, is short-circuited by a connection 24 in order to provide the well known repulsion motor reaction. The other brushes 19, spaced 90 electrical degrees from the brushes 22, connect with the secondary coil 25 of a compensating transformer, preferably through a variable resistor 26.

The transformer is provided with a core 27 having a separate leg for each of its two primary windings 29 and 30, and for its secondary winding 25. The primary windings are permanently connected in parallel with the stator windings 12 and 14 respectively.

The terminals of the supply leads 20, 31 and 32, which lead to the stator and compensating transformer primary winding, are designated by the characters A, B, C. When it is desired to operate the motor on a single phase, connection is made to the leads A—B, and the switch 21 is closed, under which circumstances the windings of the stator unit and of the compensating transformer are connected in parallel, the compensating winding being then in proper phase for its most effective action. If it is desired to operate the motor on three phase, the switch 21 is opened, and connection is made to each of the leads A, B and C. In this case both the stator and the compensator transformer primaries are connected in open delta. The resultant fields of the stator and the compensating fields will be displaced in time from the exciting fields. The phase displacement of each of these resultant fields will, however, be the same, and proper compensation will take place.

The same condition obtains when the motor is operated on quarter phase, the lead B in this case being made common, while the leads A and C are used for the separate phases. The flux through the transformer secondary coil 25 is displaced to the same degree as the resultant flux of the two stator units linking the armature coils, and hence satisfactory compensation will still occur.

A motor of this character has shunt characteristics, that is to say, its speed varies little with load, and approaches a definite maximum. This maximum speed may be varied by means of the adjustable resistor 26. Similar adjustments of this resistor will give the same speed regardless of the phase of the supply circuit, or the mode of connection (open delta or parallel) of the primary and stator coils.

A motor having these characteristics has many advantages, particularly for portable pumping plants, or for use by contractors whose installations are temporary and which may require to be set up in areas having different types of available supply circuits. The efficiency of the motor is high, comparing favorably with that of motors of the single-service type.

We claim:

1. The combination of a motor comprising a frame, a plurality of stator units positioned on said frame, each of said stator units including a single-phase winding, a rotor comprising a commutator and a winding connected thereto and magnetically linked with all of said stator units, and brushes contacting said commutator, and a compensating transformer comprising individual primary legs each connected in parallel with a respective one of said stator windings and a secondary leg connected to said commutator brushes.

2. The combination of a motor comprising a frame, a plurality of stator units positioned on said frame, each of said stator units including a single-phase winding and the poles of said stator units being alined with each other, a rotor comprising a commutator and a winding connected thereto and magnetically linked with all of said stator units, and brushes contacting said commutator, and a compensating transformer comprising individual primary legs each connected in parallel with a respective one of said stator windings and a secondary leg connected to said commutator brushes.

3. The combination of a motor comprising a frame, a plurality of stator units positioned on said frame, each of said stator units including a single-phase winding, a rotor comprising a commutator and a winding connected thereto and magnetically linked with all of said stator units, and brushes contacting said commutator, and a compensating transformer comprising a polyphase primary winding and a single-phase secondary winding, each phase of said primary winding being connected in parallel with one of said single-phase stator windings, and said secondary winding being connected to said commutator brushes.

4. The combination of a motor comprising a frame, a pair of stator units on said frame, a single-phase winding disposed on each of said units to provide poles thereon alined with each other along the frame, a rotor mounted on said frame for rotation within the stator units, a commutator on said rotor, a winding connected to said commutator, and brushes contacting said commutator, a compensating transformer having a pair of primary windings connected in parallel with said single-phase stator windings and a secondary winding connected to said brushes, and means for connecting said stator windings optionally in parallel or in open delta.

5. A motor for use optionally on single-phase or polyphase supplies comprising a plurality of single-phase field units disposed with the poles of all of said units in alinement, and an armature positioned within the fields of said units and having a winding thereon linking all of said fields, in combination with means for introducing in said winding a compensating current for producing a flux corresponding in phase and amplitude to the resultant flux produced by said field units.

6. A motor for use optionally on single-phase or polyphase supplies comprising a plurality of single-phase field units, and an armature having a winding linking the fields of all of said units, in combination with a transformer having separate primary leg windings corresponding in number to said field units and connected therewith, and secondary connections from said transformer to said armature for producing therein a current for effectively neutralizing the inductance of said field units regardless of their mode of connection.

7. A motor comprising a frame, a plurality of core units disposed coaxially along said frame, and a wave winding on each of said core units, said windings being positioned in alinement so that the ends of the winding on each unit are interleaved between the ends of the winding on an adjacent unit.

8. A motor for use optionally on single-phase or polyphase supplies comprising a plurality of single-phase field units, and an armature having a winding linking the fields of all of said units, in combination with a transformer having separate primary leg windings corresponding in number to said field units and connected therewith, secondary connections from said transformer to said armature for producing therein a current for effectively neutralizing the inductance of said field units regardless of their mode of connection, and means for controlling the strength of said current to vary the speed of the motor.

9. A motor comprising a frame, a pair of stator units on said frame, a single-phase winding disposed on each of said units to provide poles thereon alined with each other along the frame, a rotor mounted on said frame for rotation within the stator units, a commutator on said rotor, a winding connected to said commutator, and brushes contacting said commutator, in combination with a compensating transformer having a pair of primary windings connected in parallel with said single-phase stator windings and a secondary winding connected to said brushes, and a resistor in circuit with said transformer for varying the compensating current supplied thereby to said armature.

10. A motor for use optionally on single-phase or polyphase supplies comprising a plurality of single-phase core units mounted with the poles thereof substantially in alinement, a single-phase winding on each of said core units, and an armature having a winding linking the fields of all of said core units, said single-phase windings being connected in open delta, in combination with a transformer across the terminals of said open delta and connected to supply a compensating current to said armature in phase with the resultant field of all of said single-phase windings.

11. A motor for use optionally on single-phase or polyphase supplies comprising a plurality of single-phase core units mounted with the poles thereof substantially in alinement, a single-phase winding on each of said core units, and an armature having a winding linking the fields of all of said core units, said single-phase windings being connected in open delta, in combination with a transformer connected to supply a compensating current to said armature in phase with the resultant field of all of said single-phase windings.

POMPEY P. SCRIBANTE.
JOSEPH A. RAMOS.